J. P. PRAIRIE.
Combined Cotton Chopper and Cultivator.

No. 221,608. Patented Nov. 11, 1879.

WITNESSES:
Henry N. Miller
C. Sedgwick

INVENTOR:
J. P. Prairie
BY Munn & Co.
ATTORNEYS.

UNITED STATES PATENT OFFICE.

JOSEPH P. PRAIRIE, OF RALEIGH, NORTH CAROLINA.

IMPROVEMENT IN COMBINED COTTON CHOPPER AHD CULTIVATOR.

Specification forming part of Letters Patent No. 221,608, dated November 11, 1879; application filed March 19, 1879.

*To all whom it may concern:*

Be it known that I, JOSEPH P. PRAIRIE, of Raleigh, in the county of Wake and State of North Carolina, have invented a new and useful Improvement in Combined Cotton Chopper and Cultivator, of which the following is a specification.

Figure 1:
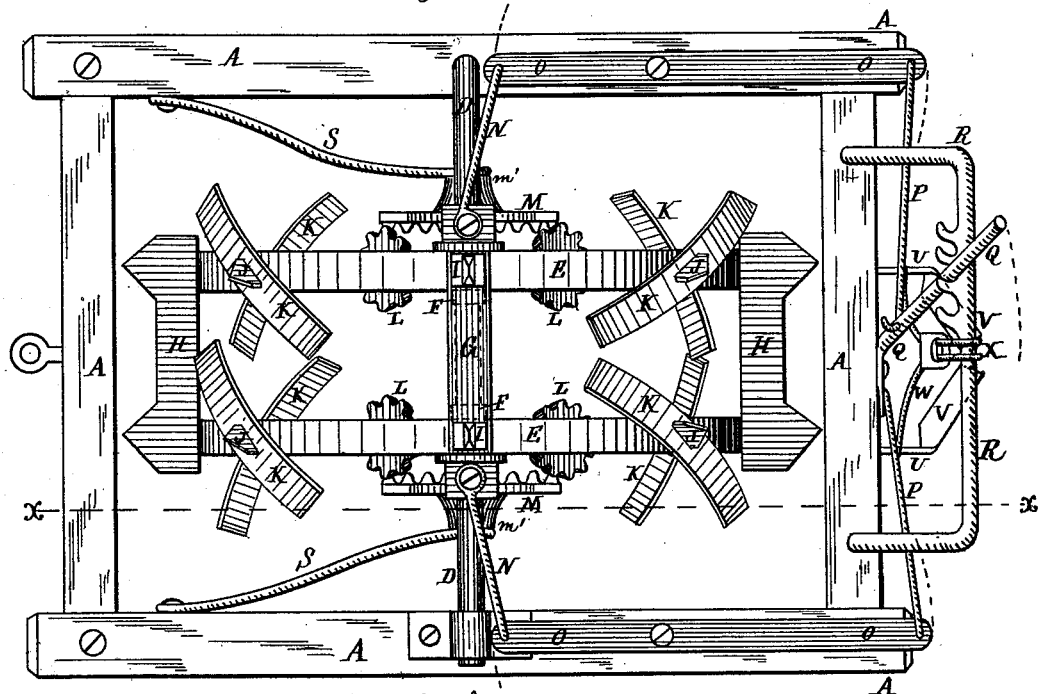
Figure 2:
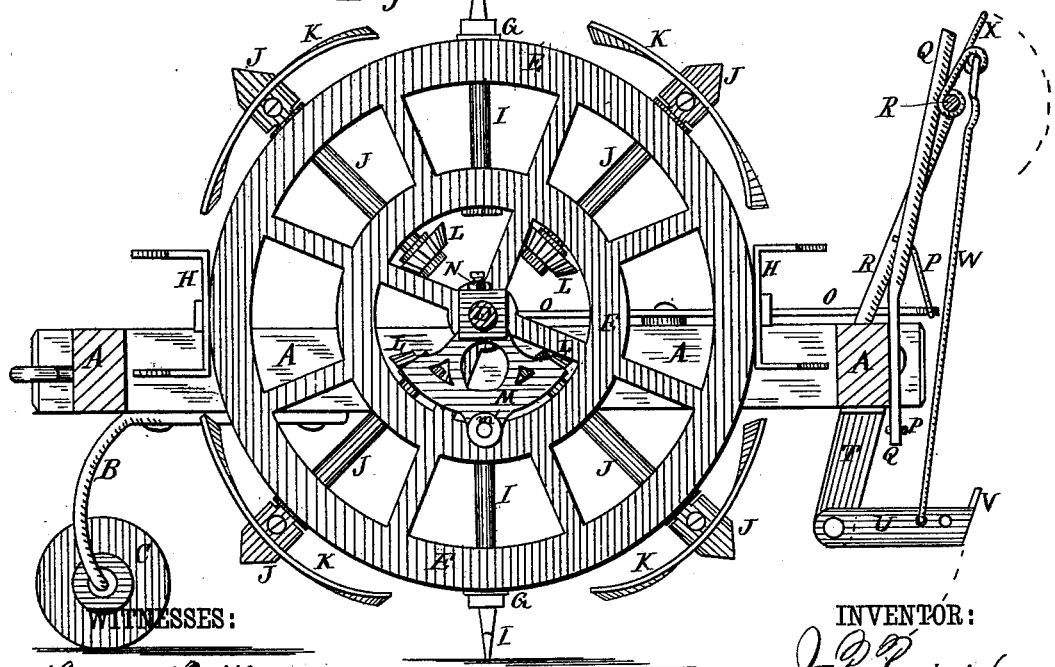

Figure 1 is a top view of my improved machine. Fig. 2 is a vertical longitudinal section of the same, taken through the line $x\ x$, Fig. 1.

Similar letters of reference indicate corresponding parts.

The object of this invention is to furnish an improved machine for chopping and cultivating cotton which shall be so constructed that it may be used for chopping, for chopping and cultivating, and for cultivating, as may be desired, and which shall be effective in operation in either capacity.

The invention consists in the combination of the arched choppers, the radial shafts, the bevel-gear wheels, and the segmental gear-wheels with the revolving wheel or wheels and the stationary shaft; in the fenders formed of the plates, having their middle parts cut away and their front and rear edges bent outward or flanged, in combination with the wheel or wheels and the revolving choppers; in the combination of the four connecting-rods and the three levers with each other, and with the frame of the machine and the hubs of the segmental gear-wheels, for throwing the said segmental gear-wheels into and out of gear with the gear-wheels of the chopper-shafts.

A represents a rectangular frame, to the forward end of which the draft is applied. To the forward corners of the frame A are attached standards B, having small wheels C pivoted to their lower ends to receive the downward draft and keep the frame A level while the machine is being used.

To the middle parts of the side bars of the frame A are attached the ends of a shaft, D, upon which revolve two wheels, E. The wheels E are kept in place upon the shaft D by collars F, placed upon the said shaft D at the inner ends of the hubs of the said wheels E, and secured in place by set-screws.

The rims of the wheels E are connected by cross-bars G, and by the fender-plates H. The fender-plates H have holes formed through their centers for the plants that are to be left to project through, and have their front and rear edges bent outward at right angles to enter the ground between the plants that are to be left for a stand and those that are to be chopped out, to prevent the soil from being torn away from the said plants by the action of the choppers. Upon the end parts of the flanges of the fender-plates H are formed angular projections to enter the ground upon the sides of the ridge, and act as prongs to prevent the wheels E from slipping.

The cross-bars G are placed midway between the fenders H, and are secured in place by nuts screwed upon radial rods I, which pass through holes in the outer and inner flanges of the wheels E, and have nuts screwed upon their inner ends. The outer ends of the screw-rods I project, and are flattened and pointed to serve as prongs to enter the ground and prevent the said wheels E from slipping.

In bearings attached to the wheels E, between the cross-bars G and the fenders H, revolve radial shafts J, to the outer ends of which are secured arched choppers K. The outer ends of the shafts J are flattened and pointed, pass through and are secured in socket in the middle parts of the knives or choppers K, and project to serve as prongs to enter the ground and prevent the wheels E from slipping.

To the inner ends of the shafts J are attached small bevel-gear wheels L, the teeth of which mesh into the teeth of the segmental gear-wheel M as the chopper K, with which each bevel-gear wheel L is connected, approaches the ground. The hubs of the segmental gear-wheels M are placed upon the shaft D at the outer ends of the hubs of the wheels E, and to them are attached the inner ends of the connecting-rods N. The outer ends of the connecting-rods N are pivoted to the forward ends of the levers O. The levers O extend back along the side bars of the frame A, are pivoted at their middle parts to the said side bars, and to their rear ends are pivoted the outer ends of the connecting-rods P. The inner ends of the connecting-rods P are pivoted to the upright lever Q upon the opposide sides of and equally distant from its pivot.

The upright lever Q is pivoted to the middle part of the rear end bar of the frame A, and its upper end projects across the catch-bar R, which is provided with teeth or notches to receive and hold the said lever Q, and its ends are bent downward and are attached to the said rear end bar of the said frame A. By this construction, by operating the lever Q the choppers may be thrown into and out of gear, as may be required.

The segments M are kept from swinging, and are braced against the pressure of the gear-wheels L by the brace-rods S, the rear ends of which are pivoted to projections $m'$, formed upon or attached to the lower part of the outer sides of the said segmental wheels M. The forward ends of the brace-rods S are pivoted to the forward parts of the side bars of the frame A.

To the lower side of the rear end bars of the frame A are attached two hangers, T, to the lower ends of which are pivoted the upper ends of two bars, U. To the lower ends of the two bars U are attached, or upon them are formed, the scrapers V, which incline inward and rearward, and the lower edges of which are inclined forward to adapt them to dirt the plants after they have been chopped to a stand.

To the bars U are pivoted the ends of a V-rod, W, the angle or bend of which is pivoted to the middle part of the lever X. One end of the lever X is pivoted to the catch-bar R, so that by raising and lowering the free end of the lever X the scrapers V will be raised from and lowered to the ground. The lever X and the loop-rod W are slightly bent, so that the said lever X will lock itself in either position.

Having thus described my invention, I claim as new and desire to secure by Letters Patent—

1. The combination of the arched choppers K, the radial shafts J, the bevel-gear wheels L, and the segmental gear-wheel M with the revolving wheel or wheels E and the stationary shaft D, substantially as herein shown and described.

2. The fenders formed of the plates H, having their middle parts cut away and their front and rear edges bent outward or flanged, in combination with the wheel or wheels E and the revolving choppers K, substantially as shown and described.

3. The combination of the connecting-rods N, the levers O, the connecting-rods P, and the upright lever Q with each other, and with the frame A, the hubs of the segmental gear-wheels M, and the pivoted brace S, for throwing the said segmental gear-wheels M into and out of gear with the gear-wheels L of the chopper-shafts J, substantially as herein shown and described.

JOSEPH PIEDALUE PRAIRIE.

Witnesses:
D. R. UPCHURCH,
M. B. BARBEE.